United States Patent
Young

(10) Patent No.: US 7,644,160 B2
(45) Date of Patent: Jan. 5, 2010

(54) LOGIN SPECIFIC VIRTUAL PORTS

(75) Inventor: Joel K. Young, Eden Prairie, MN (US)

(73) Assignee: Digi International Inc., Minnetonka, MN (US)

( * ) Notice: Subject to any disclaimer, the term of this patent is extended or adjusted under 35 U.S.C. 154(b) by 915 days.

(21) Appl. No.: 10/969,225

(22) Filed: Oct. 20, 2004

(65) Prior Publication Data

US 2006/0085523 A1    Apr. 20, 2006

(51) Int. Cl.
 *G06F 15/173* (2006.01)
(52) U.S. Cl. .................................................. 709/225
(58) Field of Classification Search ................ 709/228, 709/225
See application file for complete search history.

(56) References Cited

U.S. PATENT DOCUMENTS

| | | | |
|---|---|---|---|
| 6,047,319 A * | 4/2000 | Olson ........................ | 709/223 |
| 6,840,441 B2 * | 1/2005 | Monaghan et al. .......... | 235/379 |
| 7,051,182 B2 * | 5/2006 | Blumenau et al. .......... | 711/202 |
| 2002/0194294 A1 | 12/2002 | Blumenau et al. | |
| 2003/0152067 A1 | 8/2003 | Richmond et al. | |
| 2003/0195970 A1 | 10/2003 | Dinh et al. | |

FOREIGN PATENT DOCUMENTS

| EP | 1241858 A2 | 9/2002 |
|---|---|---|
| EP | 1241858 A2 * | 9/2002 |

OTHER PUBLICATIONS

"International Application Serial No. 05255492.9-1229, EP Office Action mailed Jan. 28, 2008", 7 pgs.
"European Search Report for corresponding European Patent Application No. EP05256492.9", (Apr. 4, 2006), 9 pgs.

* cited by examiner

*Primary Examiner*—Nathan J Flynn
*Assistant Examiner*—Michael E Keefer
(74) *Attorney, Agent, or Firm*—Schwegman, Lundberg & Woessner, P.A.

(57) ABSTRACT

A system and method of mapping remote ports so that they appear as local ports. One or more accounts is created, including a first and a second account, wherein the first account is assigned to a first user and the second account is assigned to a first computer. A plurality of first ports are assigned to the first account. A plurality of second ports are assigned to the second account. One of the second ports is mapped to a local port on the first computer. Another of the second ports is mapped to a remote port such that the remote port appears as a local port on the second computer. The first user is logged into a second computer and, while the first user is logged into the second computer, one of the first ports is mapped to a local port on the second computer and another of the first ports is mapped to a remote port such that the remote port appears as a local port on the second computer.

22 Claims, 6 Drawing Sheets

| USER ACCOUNT | VIRTUAL PORT | MACHINE PORT |
|---|---|---|
| A | P1 | P1 |
| A | P2 | P3 |
| B | P1 | P2 |
| B | P2 | P4 |

*Fig. 3*

LOGIN SPECIFIC VIRTUAL PORTS

BACKGROUND OF THE INVENTION

1. Field of the Invention

The present invention is related to connecting devices across a network, and more particularly to a system and method for mapping virtual ports.

2. Background Information

Computers include a number of ports. Ports are used to connect to external devices. Today, ports are defined for specific machines. Ports include serial ports, parallel ports, USB ports and USB hubs; the terminology may also be extended to include other device ports like audio ports, video ports, parallel ports, compact flash ports, etc.

A virtual port is a port which, although located remotely across a network or a bus, appears to be a local port on a computer. The operating system on the computer receives commands for the virtual port and redirects the commands across the network or bus to the remote port. Typically, these ports are enumerated by a sequential convention within the operating system.

Currently, virtual ports are defined for specific machines. Digi International's RealPort software, for instance, assigns a virtual port to a specific desktop. For example, within the context of RealPort COM10 on a device server might be configured to appear to be COM1 for a specific desktop while COM11 from the same device server might appear to be COM1 for a different desktop. This functionality is described in U.S. Pat. No. 6,047,319, entitled "Network Terminal Server with Full API Implementation," issued Apr. 4, 2000 to Olson, the description of which is incorporated herein by reference.

When a system administrator adds additional virtual ports, maintaining the mapping of the virtual ports becomes overly complicated. In addition, it can be difficult to move users or applications from one machine to another. If, for instance, the device connected to COM10 is needed by a particular user and that user moves to a different machine, the RealPort software has to map COM10 to the new machine. What is needed is a system and method for mapping virtual ports that solves this problem, and other problems that will become apparent in view of the discussion below.

BRIEF DESCRIPTION OF THE DRAWINGS

FIGS. 2 and 3 illustrate mapping of local and remote ports to user specific virtual ports according to the present invention;

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
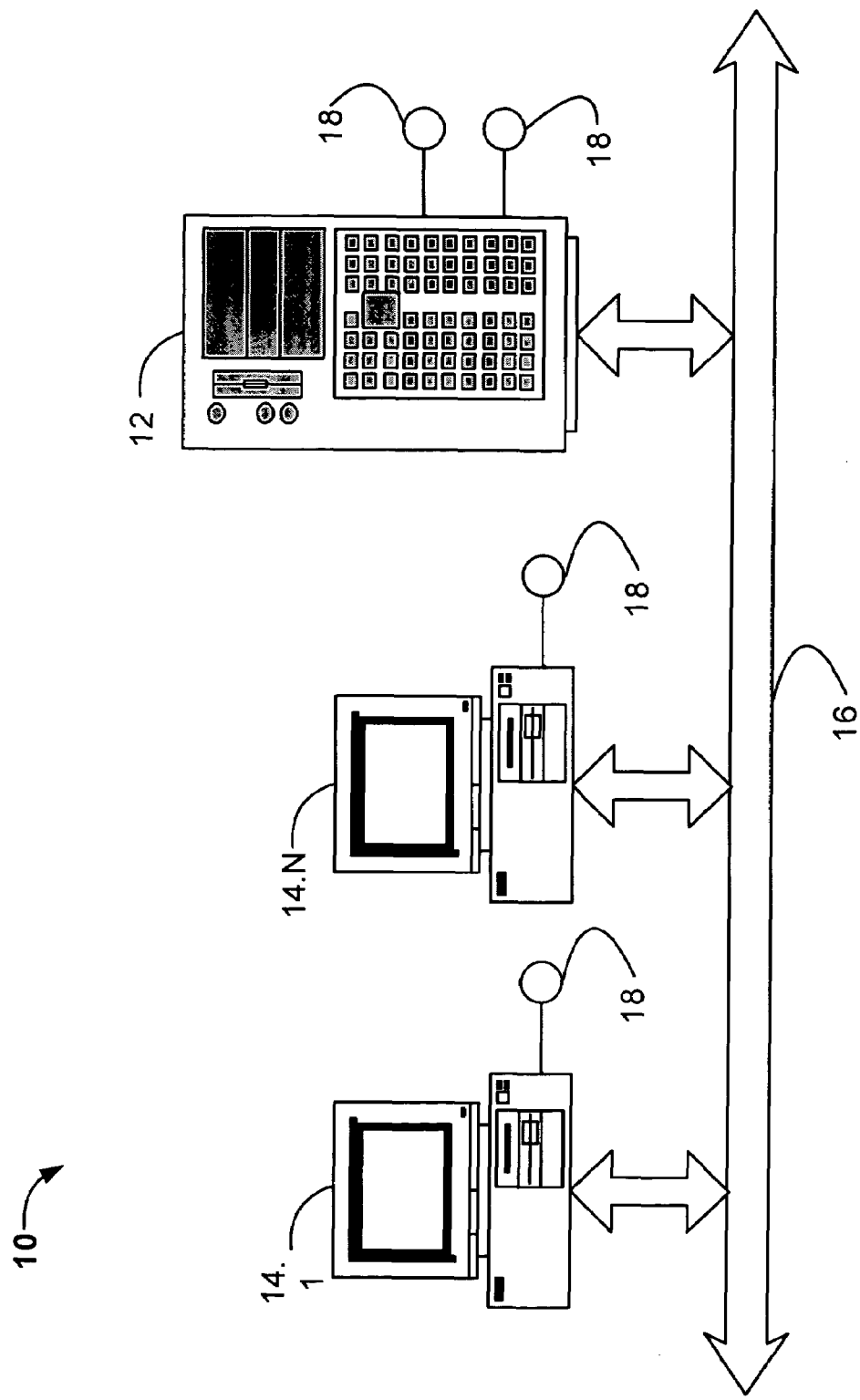
FIG. 1 illustrates a networked computer system according to the present invention.

A networked computer system 10 according to the present invention is shown in FIG. 1. In the system shown in FIG. 1, a server 12 is connected to computers 14.1 through 14.N across a network 16. Each server 12 and computer 14 includes one or more local ports 18. In addition, system 10 includes software for connecting to a port 18 connected to a server 12 or to another computer 14 across the network. In one embodiment, network 16 is an Ethernet-based network. In one such embodiment, communication with remote ports is through IP-based corn port redirect software such as RealPort com port redirector software available from Digi International of Minnetonka, Minn.

The term "computer" as used here is defined to include any digital or analog data processing unit. Examples include any personal computer, workstation, set top box, mainframe, server, supercomputer, laptop or personal digital assistant capable of embodying the inventions described herein.

Port mapping of remote ports to make them seem like local ports within an networked computer system such as system 10 will be discussed next.

The concept of virtual ports can be combined with the concept of a user account to create account specific virtual ports. An example is shown in FIG. 2.

Many computer systems use the concept of a login or user account. This is a common practice in Windows, Linux, Unix and other operating systems. Within the context of a login or desktop, the user is given certain privileges and resources. For example, one login may have administrator privileges while another may just have printing privileges. It is also common for the user account to have a file directory where login specific files are kept.

At the same time, accounts on multi-user systems tend to allow the running of multiple instances of the same task or application. For example, users logged on at the same time may execute the same database program as separate instances of the program. It can be advantageous to extend the idea of instances to virtual ports.

Figure 2:
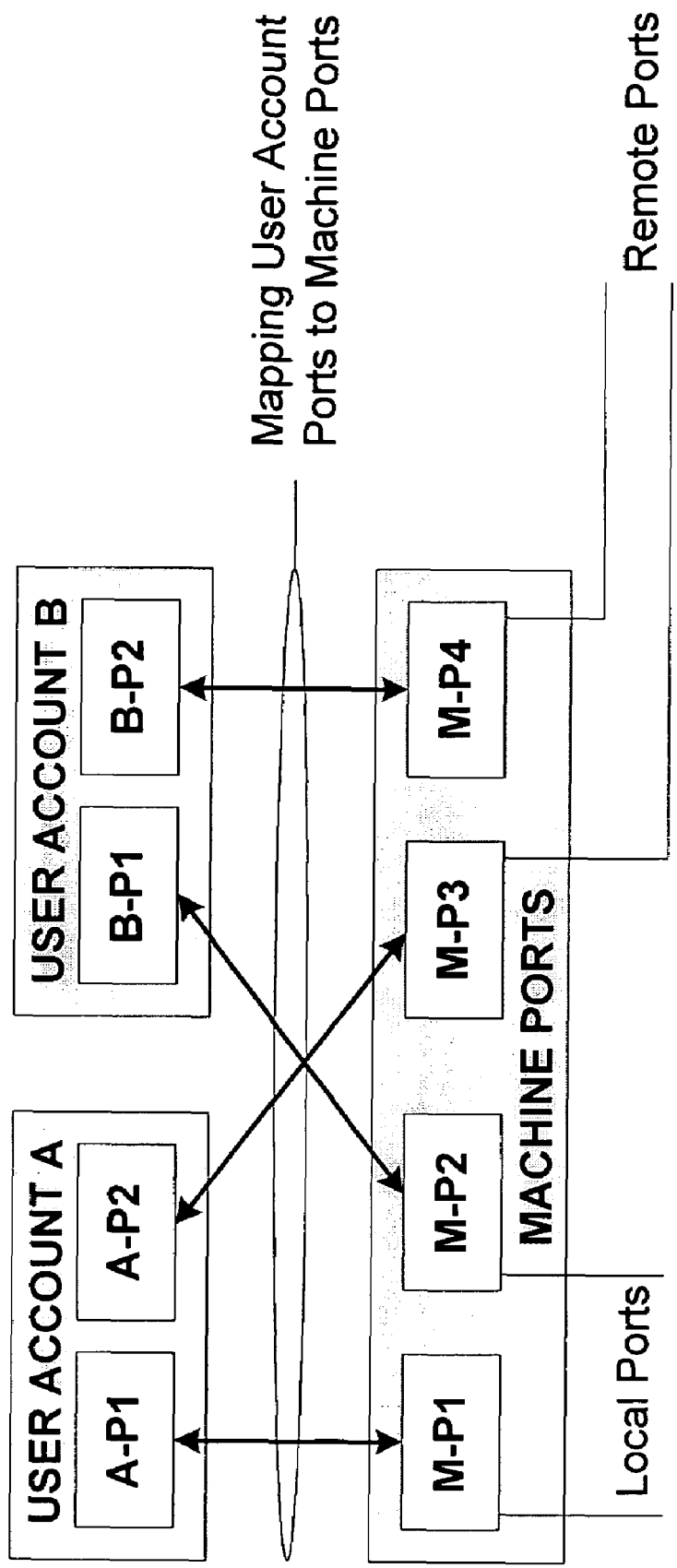

In system 10 of FIG. 2, A-P1 and A-P2 are ports which appear in account A and are labeled P1 and P2. Similarly, B-P1 and B-P2 are ports which appear in account B and are also labeled P1 and P2. M-P1 and M-P2 are ports at the machine level labeled P1 and P2. These ports are actually local to the machine. M-P3 and M-P4, however, are virtual ports (or remote ports) at the machine level, which appear with the names P3 and P4. P3 and P4 conform to the aforementioned virtual port model. P3 may be located on another computer 14, or on server 12. P4 may also be located on an entirely different machine. In one embodiment, system 10 maintains a mapping table 26 such as is shown in FIG. 3 for mapping machine ports 18 to account-specific virtual ports.

The creation of a port name within the context of a user account means that users can execute the same applications, with the same configurations, but still interact with different ports.

In one embodiment, accounts/logins can be executed locally or remotely within the system of system 10. For example, when a person sits down at an individual personal computer or workstation, they often login locally—meaning that the computer that is hosting the account is local. This connection may also be made remotely via a terminal (from a computer or traditional dumb terminal). When this happens remotely, often the ports on the specific terminal appear as local to the machine. This is different from the concept of account specific ports in that the local ports have meaning in the context of the machine which is making the connection and NOT the account which is being accessed.

FIG. 3, on the other hand, illustrates an account specific port according to one embodiment of the present invention. In this case, different users may login to their accounts at Terminal A or other Terminals. User 1 will have access to a port which will appear to be Port A, but is in fact Port 1 on the server. Similarly User 2 may connect through Terminal A and have access to a Port A, which will in fact be Port 2. Keep in mind that Port 1 and Port 2 can be physically part of the Server B, Terminal A, or additional remote ports on a network. Finally, it should be noted that the concept of an account specific port does not preclude the same port appearing on two or more different accounts.

This approach is powerful because resources on the network become part, not of a specific machine, but of the machine into which the user is logged. Mapping becomes simpler, since virtual port mappings follow the user, rather than specific machines.

Figure 4:
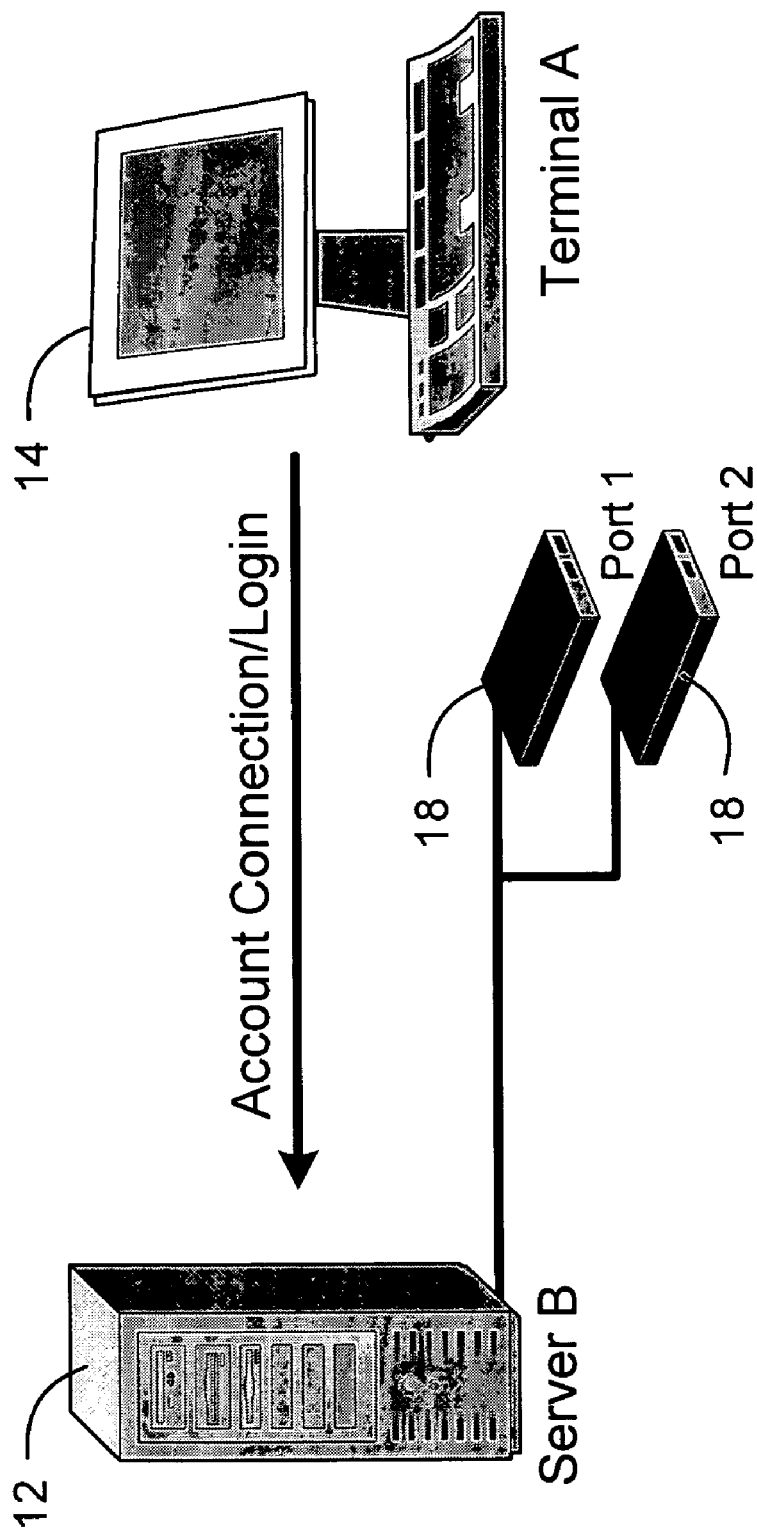
FIG. 4 illustrates desktop specific virtual ports according to the present invention.

The concept of virtual ports can be combined with the concept of a desktop identifier to create a more easily managed system of desktop specific virtual ports. An example is shown in FIG. 4.

Figure 5:
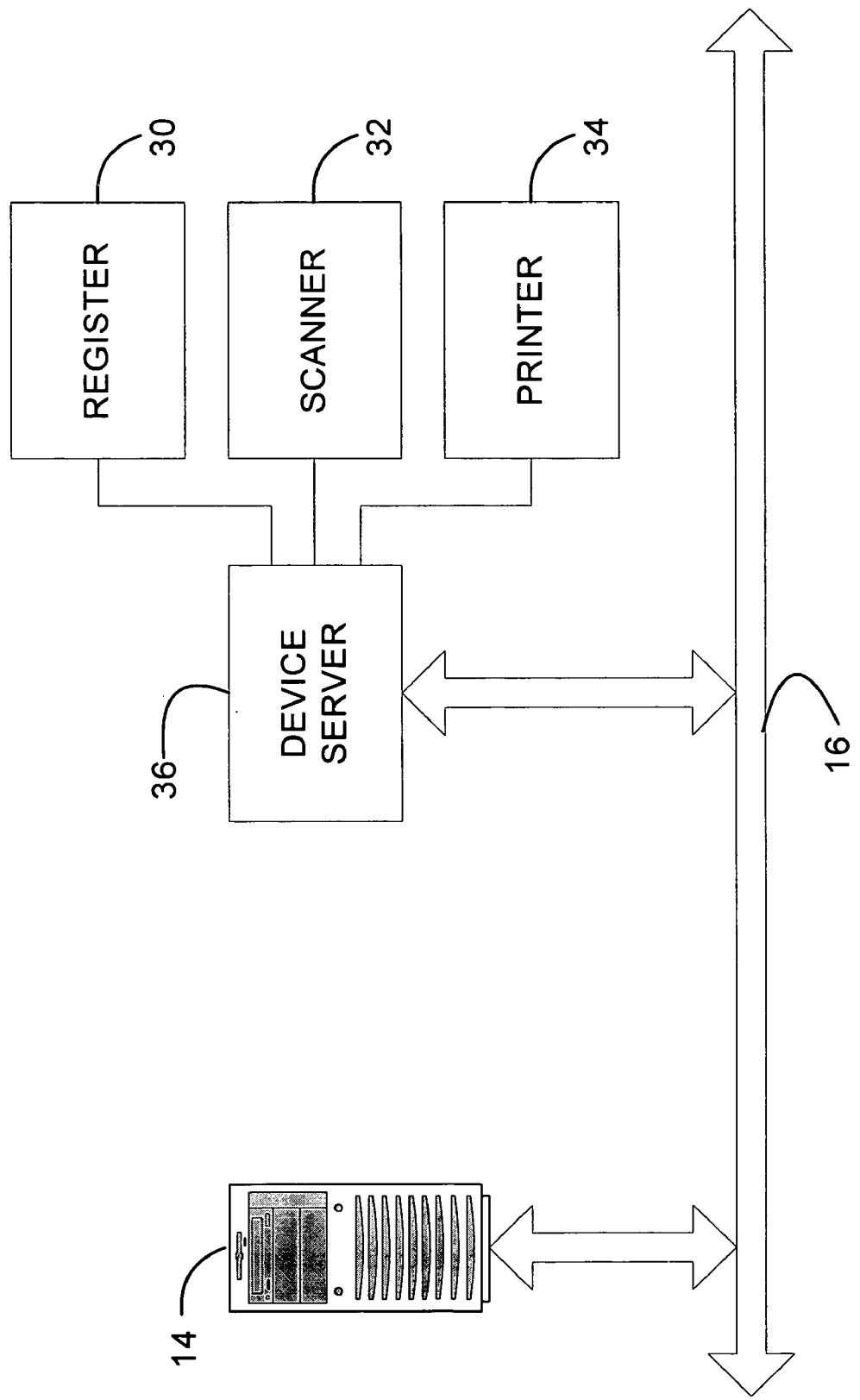
FIGS. 5 and 6 illustrate mapping of local and remote ports to virtual desktops according to the present invention.
Figure 6:
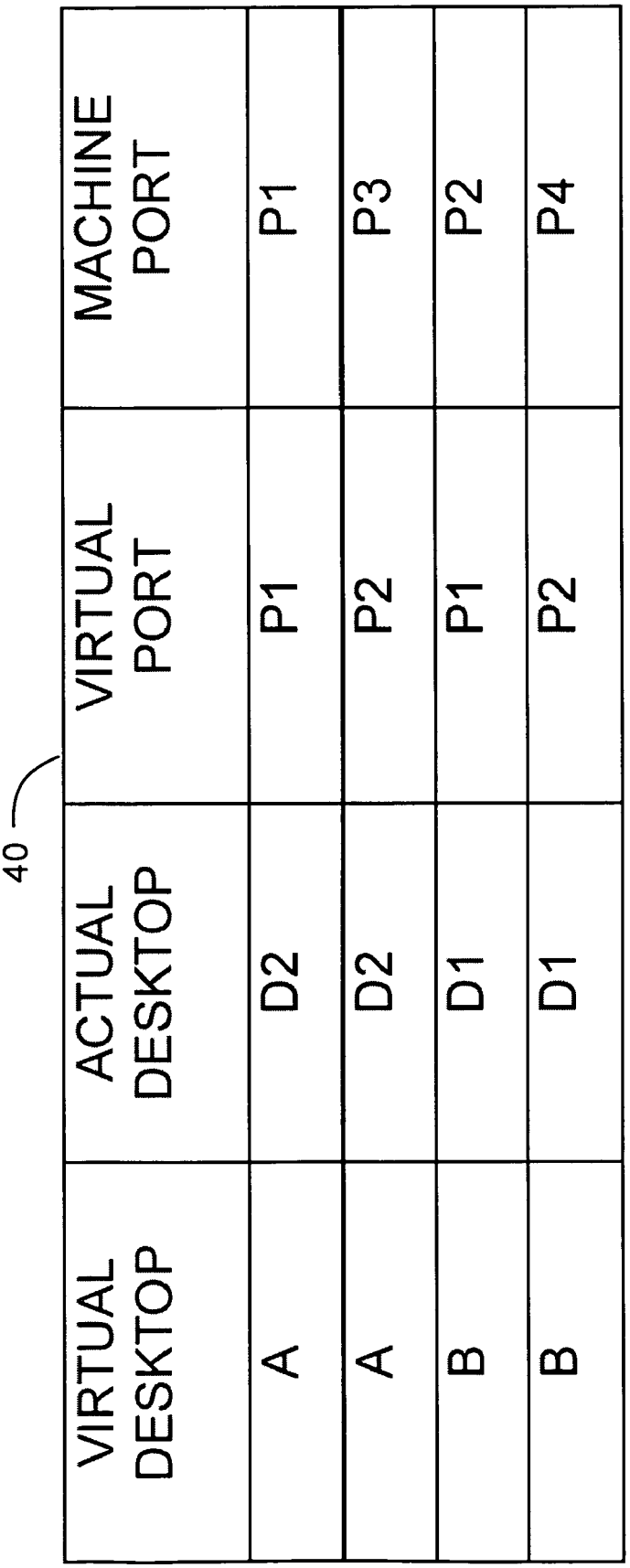

In the point-of-sale application shown in FIG. 5, a computer 14.2 is connected to a register 30, a scanner 32 and a printer 34. If you wanted to move that computer 14.2 somewhere else (for instance to a secured location), a device server 36 with remote ports 38 could be used to maintain the connections of computer 14.2 to register 30, scanner 32 and printer 34. To accomplish this, in one embodiment system 10 maintains a mapping table 40 such as is shown in FIG. 6 for mapping machine ports 18 to virtual desktops and, in turn, to actual computers 14.

Current com port redirection software assigns a virtual port to a specific remote client within the context of a desktop. System 10, on the other hand, assigns a virtual port within the context of a desktop or login, even if the port is local or remote. The software to accomplish this can be stored on computer-readable media for transportation or distribution. Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of mapping remote ports so that they appear as local ports, comprising:
   providing a plurality of computers, wherein the plurality of computers include a first computer and a separate second computer;
   assigning each user to a user account, wherein assigning each user includes assigning a first user to a first user account and assigning a second user to a second user account;
   assigning a plurality of first user ports to the first user account, wherein the plurality of first user ports include a first port and a second port;
   assigning a plurality of second user ports to the second user account, wherein the plurality of second user ports include a third port and a fourth port;
   logging the first user into the first computer; and
   while the first user is logged into the first computer, mapping the first port to a local port on the first computer and mapping, as a function of the first user account, the second port to a remote port such that the remote port appears as a local port on the first computer;
   logging the first user into the second computer; and
   while the first user is logged into the second computer, mapping the second port to the remote port as a function of first user account information such that the remote port appears as a local port on the second computer.

2. The method according to claim 1, wherein account information is stored on a server and wherein the remote port is a local port on the server.

3. The method according to claim 1, wherein account information is stored on a server and wherein the remote port is a local port on a computer connected to the server across the network.

4. The method according to claim 1, wherein the plurality of first user ports are selected from a group of port types including USB, Asynchronous serial, Bluetooth, audio, video and compact flash.

5. The method according to claim 1, wherein one of the first user ports is mapped to the same port as one of the second user ports.

6. The method according to claim 1, wherein port names associated with the first and second user ports have meaning within the context of an account, such that the same port name within different accounts map to different physical ports.

7. An article comprising a computer readable medium having instructions thereon, wherein the instructions, when executed in a computer, create a system for executing the method of claim 1.

8. The method according to claim 1, wherein the method further comprises mapping the first port to a local port on the second computer while the first user is logged into the second computer.

9. The method according to claim 1, wherein the method further comprises mapping the first port to a local port on the first computer while the first user is logged into the second computer.

10. A method of mapping remote ports so that they appear as local ports, comprising:

providing a plurality of computers, wherein the plurality of computers include a first computer, a second computer and a third computer, wherein each computer is separate from the other computers;

creating two or more accounts, including a first and a second account, wherein the first account is assigned to a first user and the second account is assigned to the first computer;

assigning a plurality of first account ports to the first account, wherein the plurality of first account ports include a first port and a second port;

assigning a plurality of second account ports to the second account;

mapping one of the second account ports to a local port on the first computer and mapping another of the second account ports to a remote port such that the remote port appears as a local port on the first computer;

logging the first user into the second computer; and while the first user is logged into the second computer, mapping the first port to a local port on the second computer and mapping the second port to a remote port as a function of first account information such that the remote port appears as a local port on the second computer;

logging the first user into the third computer; and while the first user is logged into the third computer, mapping the second port to the remote port as a function of first account information such that the remote port appears as a local port on the third computer.

11. The method according to claim 10, wherein account information is stored on a server and wherein one of the remote ports is a local port on the server.

12. The method according to claim 10, wherein account information is stored on a server and wherein the remote port is a local port on a computer connected to the server across the network.

13. The method according to claim 10, wherein the plurality of first account ports are selected from a group of port types including USB, Asynchronous serial, Bluetooth, audio, video and compact flash.

14. The method according to claim 10, wherein one of the first account ports is mapped to the same port as one of the second account ports.

15. The method according to claim 10, wherein port names associated with the first and second account ports have meaning within the context of an account, such that the same port name within different accounts map to different physical ports.

16. The method according to claim 10, wherein account information is stored on a server and wherein the remote port is a local port on the server.

17. The method according to claim 10, wherein the method further comprises mapping the first port to a local port on the third computer while the first user is logged into the third computer.

18. The method according to claim 10, wherein the method further comprises mapping the first port to a local port on the second computer while the first user is logged into the third computer.

19. A method of mapping remote ports so that they appear as local ports, comprising:

providing a plurality of computers, wherein the plurality of computers include a first computer, a second computer and a third computer, wherein each computer is separate from the other computers;

assigning a plurality of first ports to a first virtual desktop;

assigning a plurality of second ports to a second virtual desktop;

mapping the first virtual desktop on the first computer, wherein mapping the first virtual desktop on the first computer includes mapping one of the first ports to a local port on the first computer and mapping another of the first ports to a first remote port such that the first remote port appears as a local port on the first computer;

mapping the second virtual desktop on the second computer, wherein mapping the second virtual desktop on the second computer includes mapping one of the second ports to a local port on the second computer and mapping another of the second ports to a second remote port such that the second remote port appears as a local port on the second computer; and moving the first virtual desktop to the third computer, wherein moving includes mapping one of the first ports to the first remote port such that the first remote port appears as a local port on the third computer.

20. An article comprising a computer readable medium having instructions thereon, wherein the instructions, when executed in a computer, create a system for executing the method of claim 19.

21. The method according to claim 19, wherein moving includes mapping one of the first ports to a local port on the third computer.

22. The method according to claim 19, wherein moving includes mapping one of the first ports to a local port on the first computer.

* * * * *

UNITED STATES PATENT AND TRADEMARK OFFICE
CERTIFICATE OF CORRECTION

PATENT NO. : 7,644,160 B2  Page 1 of 1
APPLICATION NO. : 10/969225
DATED : January 5, 2010
INVENTOR(S) : Joel K. Young It is certified that error appears in the above-identified patent and that said Letters Patent is hereby corrected as shown below:

On the title page, item (56), under "Foreign Patent Documents", in column 2, line 1, below "FOREIGN PATENT DOCUMENTS" delete "EP   1241858   A2   9/2002".

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,644,160 B2 Page 1 of 1
APPLICATION NO. : 10/969225
DATED : January 5, 2010
INVENTOR(S) : Joel K. Young It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twenty-first Day of December, 2010

David J. Kappos
*Director of the United States Patent and Trademark Office*